United States Patent

Verdonschot

[11] Patent Number: 6,021,687
[45] Date of Patent: Feb. 8, 2000

[54] SELECTOR MECHANISM FOR OPERATING A GEARBOX

[75] Inventor: Wilhelmus Henrikus Verdonschot, Nederweert, Netherlands

[73] Assignee: DAF Bus International B.V., Eindhoven, Netherlands

[21] Appl. No.: 09/117,263

[22] PCT Filed: Jan. 14, 1997

[86] PCT No.: PCT/NL97/00012

§ 371 Date: Jul. 27, 1998

§ 102(e) Date: Jul. 27, 1998

[87] PCT Pub. No.: WO97/27412

PCT Pub. Date: Jul. 31, 1997

[30] Foreign Application Priority Data

Jan. 26, 1996 [NL] Netherlands ............... 1002186

[51] Int. Cl.[7] .............. F16C 1/10; B62D 11/00; B62D 5/06

[52] U.S. Cl. ............ 74/501.5 H; 74/500.5; 74/471 XY; 180/6.48; 180/414

[58] Field of Search ............ 74/471 XY, 471 R, 74/479.01, 480 R, 491, 492, 500.5, 501.5 R, 501.5 H, 501.6, 502, 502.1; 180/6.48, 414

[56] References Cited

U.S. PATENT DOCUMENTS

| | | | |
|---|---|---|---|
| 3,177,357 | 4/1965 | Raynak | 74/502.1 |
| 3,183,736 | 5/1965 | Jacobson | 74/502.1 |
| 3,253,481 | 5/1966 | Warhol | 74/502.1 |
| 3,604,284 | 9/1971 | Houk | 74/491 |
| 3,611,827 | 10/1971 | Bottum | 74/471 XY |
| 3,625,302 | 12/1971 | Lauck | 74/471 XY |
| 3,891,042 | 6/1975 | Braun | 180/6.48 |
| 4,152,950 | 5/1979 | Langford | 74/471 XY |
| 4,261,220 | 4/1981 | Gill | 74/501 |
| 4,503,726 | 3/1985 | Green | 74/501.5 R X |
| 5,553,992 | 9/1996 | Ashcroft | 74/471 XY X |
| 5,752,578 | 5/1998 | Kellogg | 180/414 |

FOREIGN PATENT DOCUMENTS

| | | |
|---|---|---|
| 0068654 | 1/1983 | European Pat. Off. . |
| 0170132 | 2/1986 | European Pat. Off. . |
| 1750938 | 3/1970 | Germany . |
| 7803984 | 11/1978 | Netherlands . |
| 1013657 | 12/1965 | United Kingdom . |
| WO 90/13863 | 11/1990 | WIPO ............ 74/471 XY |

*Primary Examiner*—Vinh T. Luong
*Attorney, Agent, or Firm*—Jacobson, Price, Holman & Stern, PLLC

[57] ABSTRACT

A gearbox is provided with a selector shaft, which is capable of reciprocating movement for selecting the selector slot and rotating movement for changing gears. A gear lever is connected to a first constructional member, provided with a first and a second coupling point, which are positioned on one side of a first axis and on either side of a second axis, and a third coupling point, positioned on the second axis. The selector shaft is provided with a second constructional member, with two coupling points positioned one either side of an axis of rotation, and a further coupling point. The coupling points on the first constructional member and the coupling points on the second constructional member are interconnected and the third coupling point is connected to the further coupling point. The connections are made up of a power transmission which can only transmit forces being exerted in one direction. This reduces play and results in a lighter, more compact selector mechanism.

4 Claims, 3 Drawing Sheets

SELECTOR MECHANISM FOR OPERATING A GEARBOX

FIELD OF THE INVENTION

The invention relates to a device for operating a gearbox, in particular for use in lorries and buses, whereby the gearbox is provided with a selector shaft, which is capable of reciprocating movement for selecting the gear train and of rotating movement for changing gears, which selector shaft is coupled to a remote control lever.

BACKGROUND OF THE INVENTION

When the first buses comprising gearboxes were constructed, the engine was mounted in front and the gearbox was positioned beside the driver. The control lever for the gear box was mounted directly in the gearbox and its control was thus easy and direct. A drawback was the fact that the gearbox, and thus the control lever, was directly connected to the engine and moved and rattled along with the engine. When the engine was moved to the centre or ever to the rear of the bus, this method of coupling the gear lever directly to the gearbox could no longer be used. The control problem was solved by mounting the lever in the floor near the driver and connecting it to the gear box via a long rod. The gearbox was still controlled fairly directly, but greater operating forces were required due to the increased number of bearing points. Since the control lever was still directly connected to the gearbox, it still moved along with the gearbox and the engine and still passed noise into the interior. In addition to that the increased operating mass occasionally caused the gearbox to change to neutral of its own accord upon abrupt braking.

When subsequently manufacturers started to build high-deck motor coaches, it often appeared to be impossible to guide the selector rod past the luggage spaces between the two axles of these high-deck coaches. A solution for this problem was found in coupling the gearbox to the control lever via Bowden cables. This made it possible to manoeuvre past all obstacles. Since both the inner and the outer cables are thereby connected to the vibrating motor on the one hand and to the stationary chassis on the other hand, the engine movement is no longer passed to the control lever, so that the latter no longer moves along with the engine and cannot slip out of gear so easily any more. Due to the fact that the outer cables of the Bowden cables are rubber-mounted and the inner cables slightly function as springs, the noises from the engine and the gearbox are no longer transmitted to the control lever, and consequently they are no longer transmitted to the interior, either.

With the present gearboxes the changing of gears is carried out by the control lever in four directions of movement, viz. to the left or to the right for selecting the gear train, and then forward or backward for engaging the gear. With the known control systems the transmission of said movements from the control lever to the gearbox takes place via two Bowden cables. The cables are alternately loaded in tension and compression thereby, and move forward or backward in their outer cables. At the gearbox the movements of the cables imparted by the lever are converted into reciprocating and rotating movements respectively of the selector shaft. Said selector shaft is thereby moved up or down for selecting the gear train and subsequently rotated clockwise or anti-clockwise for changing gears.

As a result of the reversal of the direction of the forces exerted on the inner cables said inner cables will make contact with the outer cables in the inside bends when loaded in tension and in the outside bends when loaded in compression. All this results in a back lash when changing from pull to push. This back lash is furthermore even increased as a result of the fact that the cable is extended in the direction of pulling and shortened in the direction of pushing before movement is actually transmitted. This leads to the movements of the control lever becoming larger and the sense of direct operation being lost.

SUMMARY OF THE INVENTION

The object of the invention is to obviate this drawback and to provide a device for operating a gearbox which is capable of changing gears directly and without play over a considerable distance.

In order to accomplish the above objective the device according to the invention is characterized in that the control lever is connected to a first constructional member, which is journaled in the device in such a manner as being capable of making a tilting movement about a first axis as well as a tilting movement about a second axis, which axes cross each other in a central point, whereby said constructional member is provided with a first and a second coupling point, which are positioned on one side of said first axis and on either side of said second axis, and also with a third coupling point, which is positioned on said second axis, on the other side of said first axis, whereby the selector shaft is provided with a second constructional member, which is on one side of the selector shaft axis provided with a constructional member rotatably connected thereto, which constructional member is provided with two coupling points positioned on either side of an axis of rotation, said constructional member being furthermore rotatably connected to a reaction rod connected to the gearbox, whereby said second constructional member is on the other side of the selector shaft axis provided with a further coupling point, said first and said second coupling points being connected to the coupling points on the rotatable constructional member and whereby said third coupling point is connected to said further coupling point, said connections being made up of power transmission means which can only transmit forces being exerted in one direction.

The power transmission means according to another advantageous embodiment of the device according to the invention are made up of cables which are guided in appropriate guides and which are exclusively loaded in tension.

In another embodiment said power transmission means are made up of hydraulic medium columns, which are present in appropriate pipes, whereby each pipe is on either end provided with a cylinder comprising a piston, the piston rod thereof being connected to an associated coupling point and each medium column only being loaded in compression.

In a further embodiment the second constructional element is not directly connected to the selector shaft but by means of an intermediate element which is able to increase the forces delivered by the power transmission means (a so-called servo-support). The power transmission means also in this embodiment can be constituted by cables or liquid columns.

By connecting the control lever to three coupling points in the above-described manner and connecting said three coupling points, via three power transmission means, to three coupling points which are connected to the selector shaft, a closed power and movement transmission system has been obtained, whereby, as will be explained in more detail hereafter in the description of the Figures, only forces being exerted in one direction will be transmitted from the control lever to the selector shaft, as a result of which a very direct coupling of the movements of the control lever to the selector shaft has been obtained.

Since some play might occur upon reversal of the movements of the power transmission means, which is undesirable, of course, another advantageous embodiment of the device according to the invention is characterized in that the power transmission means interconnecting said third coupling point and said further coupling point are biased. As a result of said power transmission means being biased also the two other power transmission means are automatically biased, so that a transmission of reversible movements with an unchanged direction of force in the transmission means without any play is achieved. The invention will be explained in more detail with reference to the drawing.

DETAILED DESCRIPTION OF THE PREFERRED EMBODIMENTS

Figure 1:
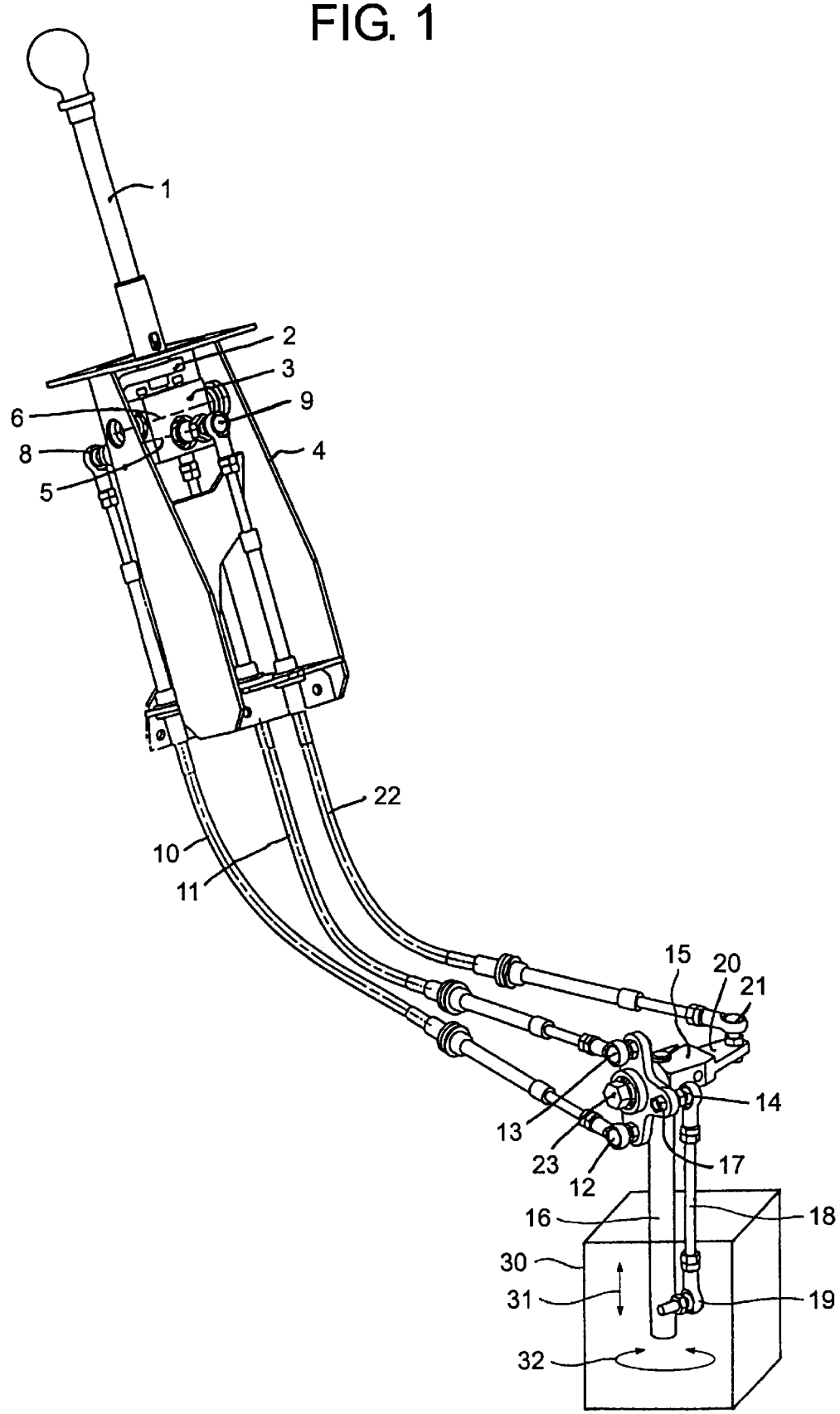
FIGS. 1 and 2 are a schematic perspective front view and a schematic perspective rear view, respectively, of a device for operating a gearbox.

In the Figures numeral 1 indicates an control lever, which is connected to a hook-shaped constructional member 2, which is rotatably connected to a block 3, which is rotatably journaled in housing 4 of the device. Axes 5 and 6, about which hook-shaped element 2 and block 3 respectively are rotatable, cross each other perpendicularly. The hook-shaped element comprises two coupling points 8 and 7, positioned on either side of the center line 5 about which they can rotate. Block 3 comprises a coupling point 9, positioned on the center line 5 about which coupling points 8 and 7 are rotatable, but on the side of center line 6 remote from the coupling points 8 and 7.

Coupling points 7 and 8 are connected, via two Bowden cables 10 and 11, to coupling points 12 and 13, which are positioned on a constructional member 15 which is fixedly connected to a selector shaft 16 of a gearbox 30. Constructional member 14 is furthermore rotatably connected to a reaction rod 18 at 17, which reaction rod is with its other end 19 coupled to the housing of the gearbox 30. Constructional member 15 attached to the selector shaft 16 is on the other side of the axis of rod 17 provided with a lever 20, which in turn comprises a coupling point 21, said coupling point 9 connected to the control lever is connected, via a third Bowden cable 22, to the aforesaid coupling point 21. By tensioning the outer cable of said third Bowden cable 22 in the direction of pulling of the inner cable, all cables are biased in their direction of pulling, so that any play in the system is completely eliminated.

The operation of the illustrated device is as follows: when lever 1 in FIG. 1 is for example moved to the right for selecting the correct gear train, the hook-shaped element 2 is rotated about axis 5, likewise to the right, whereby coupling point 8 will move up and coupling point 7 will move down. Coupling point 9 will remain in position thereby, because it is positioned on the axis of rotation 5. Since the movements of coupling points 7 and 8 are transmitted to coupling points 12 and 13 via cables 10 and 11, constructional member 14 will thereby rotate in clockwise direction about its center of rotation 23. Because constructional member 14 is rotatably connected to fixed point 17, the center of rotation 23 of constructional member 14 will move up and rod 16 will likewise be moved up in one of the directions of arrow 31. When lever 1 is moved in the other direction, that is, to the left, coupling point 7 will move up and coupling point 8 will move down, which movements are in turn transmitted to coupling points 12 and 13 via cables 10 and 11, as a result of which constructional member 14 will make a rotating movement in anti-clockwise direction, which means that the center of rotation 23 is moved down and that selector shaft 16 is thus likewise moved down. When subsequently control lever 1 is moved forward or backward, this will cause block 3 to rotate about axis 6, whereby coupling point 9 is moved up or down, which movements are transmitted to coupling point 21 via Bowden cable 22, as a result of which said coupling point is moved forward or backward, thus imparting a rotating movement to selector shaft 16 in one of the directions of arrow 32. Coupling points 7 and 8 will move down or up simultaneously with the upward or downward movement of coupling point 9, which movement will be imparted, via Bowden cables 10 and 11, to coupling points 12 and 13 on constructional member 14, which will likewise move forward or backward, thereby rotating the axis of selector shaft 16. In this manner it has become possible to transmit the correct movements of the control lever to the selector shaft by only using pulling forces in the cables of a closed system of three Bowden cables.

Although in the embodiment as disclosed in the Figures the constructional element 14 is directly connected to the selector shaft 16, it is under circumstances also possible to couple the element 14 by means of an intermediate element, a so-called servo-support, to the selector shaft 16. Such an element serves as a force amplifier, which amplifies the forces exerted by the Bowden-cables. In this way the forces exerted by the driver on the control lever 1 may be very small.

Because of the fact that in the power transmission means all forces are always exerted in the same direction, and because said power transmission means are biased, the operating device according to the invention is without play, as a result of which the movements of the control lever can be much director and shorter than has been possible with the known devices. An advantage thereof is that the space required for the control lever may be much smaller and that the control lever may be positioned much closer to the driver, which enhances the ease of operation.

Figure 2:
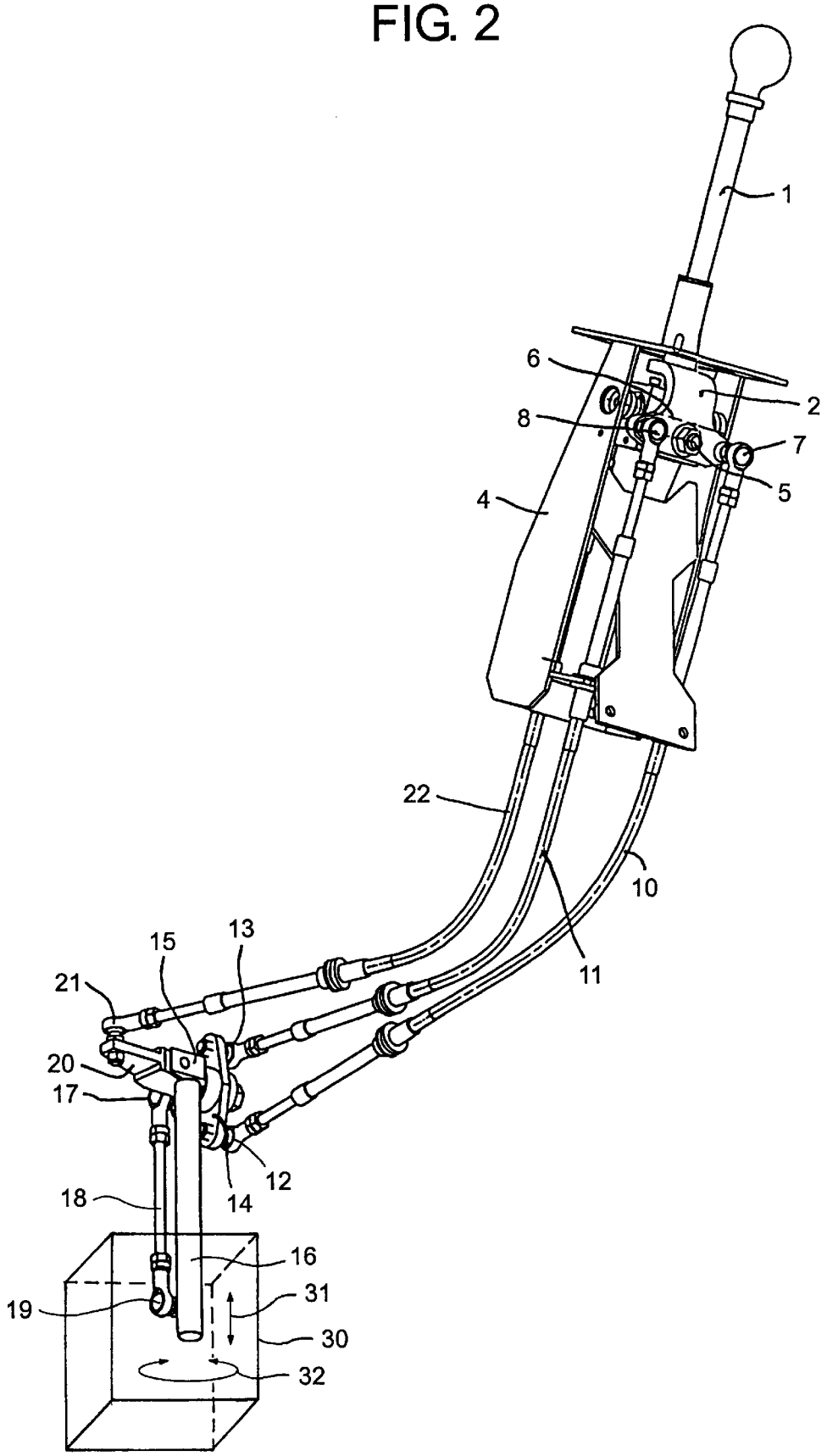
Figure 3:
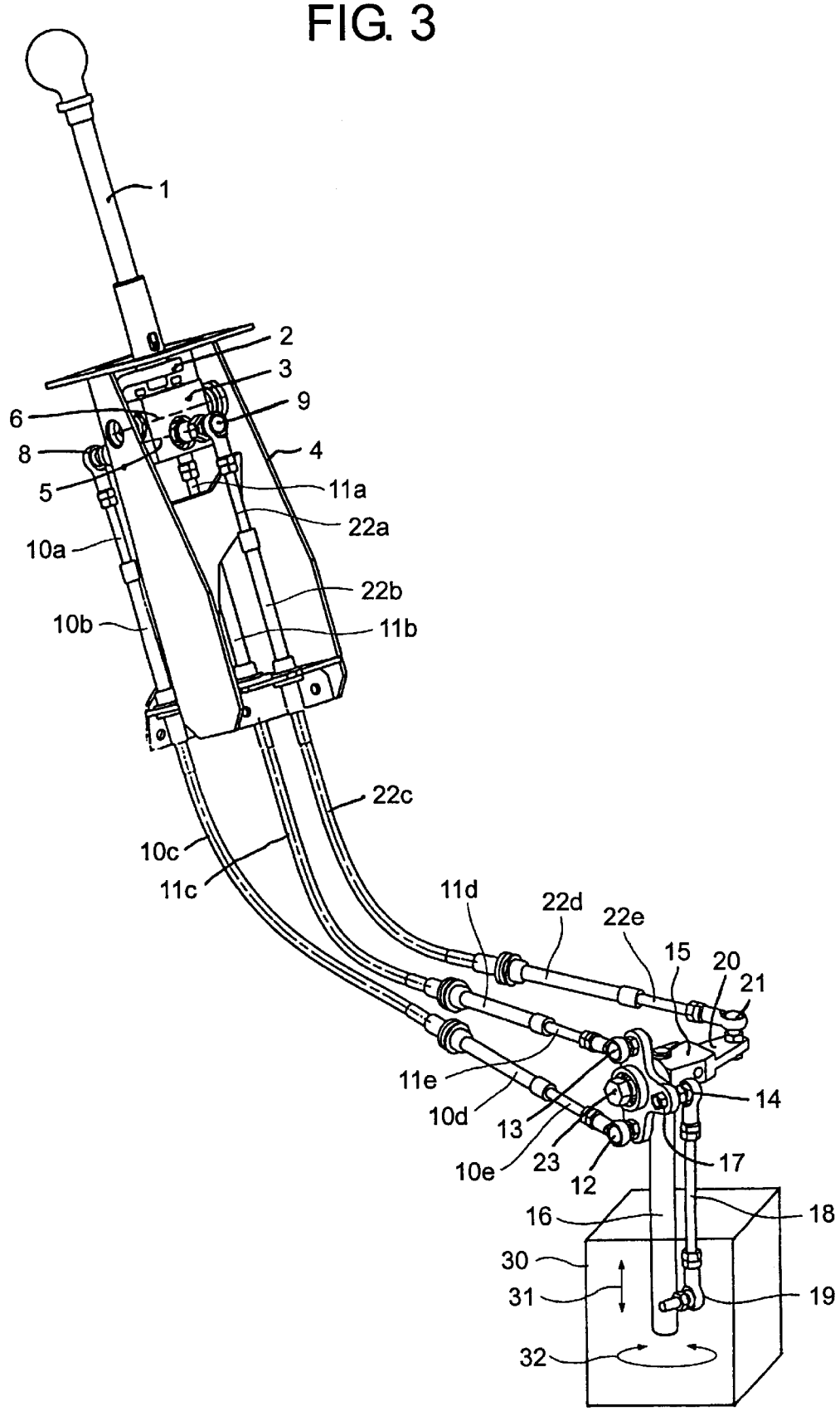
FIG. 3 is a schematic perspective rear view of an hydraulic device for operating a gearbox.

Although the transmission means used in the illustrated embodiment of the device as shown in FIGS. 1 and 2 are in the form of Bowden cables, it is also possible to transmit the movements via fluid columns which can be displaced within pipes 10c, 11c, 22c as shown in FIG. 3. Each coupling point 7, 8, 9 and 12, 13, 21 is thereby connected to a piston rod 10a, 11a, 22a and 10e, 11e, 22e, which cooperates with a piston in an associated cylinder 10a, 11a, 22a and 10e, 11e, 22e. In that case each of the cylinders 10b, 11b, 22b at the control lever end of the device is connected to a cylinder 10d, 11d, 22d having piston rods 10e, 11e, 22e at the selector shaft end of the device. The fluid columns in pipes 10c, 11c, 22c are thereby of course subjected to compression forces for the transmission of the movements of the control lever to the selector shaft 16.

I claim:

1. A device for operating a gearbox, said device comprising:
    a selector shaft capable of reciprocating movement for selecting a gear train and of rotating movement for changing gears, said selector shaft being coupled to a remote control lever, said remote control lever being connected to a first constructional member, said first constructional member being journaled in the device in such a manner as being capable of making a tilting movement about a first axis as well as a tilting movement about a second axis, which axes cross each other, said first constructional member being provided with a first and a second coupling point, which are positioned on one side of said first axis and on either side of said second axis, and also with a third coupling point, which is positioned on said second axis, on the other side of said first axis and the coupling points being connected with coupling points of at least a further constructional member cooperating with the selector shaft by a power transmission, which only transmits forces being exerted in one direction, the first constructional member is being provided with two perpendicular shafts, which are journaled in a housing of the device, the selector shaft being provided with a second constructional member, which is on one side of the selector shaft axis provided with a constructional member rotatably connected thereto, which constructional member is provided with two coupling points positioned on either side of an axis of rotation, said constructional member being furthermore rotatably connected to a reaction rod for connection to the gearbox, whereby said second constructional member is on the other side of the selector shaft axis provided with a further coupling point, said first and said second coupling point being connected to the coupling points on the rotatable constructional member and whereby said third coupling point is connected to said further coupling point and whereby the power transmission is firmly connected to the coupling points of the respective constructional members.

2. A device according to claim 1, wherein the power transmission is coupled to the second constructional member and the rotatable constructional member in such a manner, that reciprocating movement of the selector shaft is transverse to a part of the power transmission directly adjacent to said constructional members.

3. A device according to claim 1, wherein said power transmission is made up of hydraulic medium columns, which are present in appropriate pipes, whereby each pipe is on either end provided with a cylinder comprising a piston, the piston rod of which is connected to an associated coupling point, each medium column being only subjected to forces.

4. A device according to claim 1, wherein said power transmission interconnecting said third coupling point and said further coupling point, is biased.

* * * * *